United States Patent
Godinsky

(10) Patent No.: US 10,288,133 B1
(45) Date of Patent: May 14, 2019

(54) ROTATIONAL COUPLING DEVICE HAVING MEANS FOR SEALING THE INTERFACE BETWEEN THE ARMATURE AND THE ELECTROMAGNET

(71) Applicant: Warner Electric Technology LLC, Braintree, MA (US)

(72) Inventor: Joseph Mark Godinsky, Sycamore, IL (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 15/833,574

(22) Filed: Dec. 6, 2017

(51) Int. Cl.
| F16D 27/112 | (2006.01) |
| F16D 65/00 | (2006.01) |
| F16D 65/18 | (2006.01) |
| F16D 55/02 | (2006.01) |

(52) U.S. Cl.
CPC ......... F16D 65/0025 (2013.01); F16D 55/02 (2013.01); F16D 65/186 (2013.01)

(58) Field of Classification Search
CPC .... F16D 27/112; F16D 55/02; F16D 65/0025; F16D 65/186
See application file for complete search history.

(56) References Cited

U.S. PATENT DOCUMENTS

| 2,321,205 | A | * | 6/1943 | Hodgson | F16D 55/28 188/171 |
| 3,665,231 | A | * | 5/1972 | Wendler | F16D 55/28 310/77 |
| 4,126,215 | A | | 11/1978 | Puro | |
| 4,684,838 | A | * | 8/1987 | Casanova | F16D 55/28 188/171 |
| 4,793,457 | A | | 12/1988 | Siewert et al. | |
| 5,362,073 | A | * | 11/1994 | Upton | E21B 10/25 175/371 |
| 5,396,976 | A | | 3/1995 | Koitabashi | |
| 5,699,883 | A | * | 12/1997 | Albrecht | B60T 13/743 188/158 |
| RE36,452 | E | * | 12/1999 | Upton | E21B 10/25 277/336 |
| 6,459,182 | B1 | | 10/2002 | Pfann et al. | |

(Continued)

FOREIGN PATENT DOCUMENTS

| FR | 2605155 A1 | 4/1988 |
| JP | H04-113036 A | 4/1992 |
| JP | 2004-270759 A | 9/2004 |

OTHER PUBLICATIONS

English language abstract of FR 2 605 155.

(Continued)

Primary Examiner — Thomas W Irvin
(74) Attorney, Agent, or Firm — Reising Ethington P.C.

(57) ABSTRACT

A rotational coupling device includes a rotor configured for rotation about a rotational axis, a brake plate disposed on a first axial side of the rotor, an armature disposed on a second axial side of the rotor opposite the brake plate, and an electromagnet disposed on one axial side of the armature opposite the rotor and the brake plate. A spacer is disposed axially between the brake plate and the electromagnet and radially outwardly of the rotor and the armature. A seal is supported on a radially inner surface of the spacer radially outward of the armature and seals the interface between armature and electromagnet.

24 Claims, 3 Drawing Sheets

(56) References Cited

U.S. PATENT DOCUMENTS

| | | | | |
|---|---|---|---|---|
| 6,675,940 B2* | 1/2004 | Maurice | ............... | B60T 7/107 |
| | | | | 188/156 |
| 6,811,009 B2 | 11/2004 | Inoue et al. | | |
| 7,267,214 B2 | 9/2007 | Bittner et al. | | |
| 9,279,460 B2* | 3/2016 | Qin | ............... | F16D 27/112 |
| 9,453,571 B2* | 9/2016 | Qin | ............... | F16H 55/44 |
| 9,458,897 B2* | 10/2016 | Qin | ............... | F16D 27/112 |
| 9,482,286 B2* | 11/2016 | Qin | ............... | F16D 13/38 |
| 9,863,486 B2* | 1/2018 | Qin | ............... | F16D 13/76 |
| 2006/0169550 A1 | 8/2006 | Albrecht | | |
| 2007/0107998 A1* | 5/2007 | Vogt | ............... | F16D 67/00 |
| | | | | 188/163 |
| 2010/0210745 A1* | 8/2010 | McDaniel | ............... | C09D 5/008 |
| | | | | 521/55 |
| 2015/0129388 A1* | 5/2015 | Tilly | ............... | F16D 27/112 |
| | | | | 192/48.3 |

OTHER PUBLICATIONS

English language abstract of JP 2004-270759.
English language machine translation of JP 2004-270759.
International Search Report issued in corresponding International (PCT) Patent Application No. PCT/US2018/063607 (dated Mar. 1, 2019).
Written Opinion issued in corresponding International (PCT) Patent Application No. PCT/US2018/063607 (dated Mar. 1, 2019).

* cited by examiner

ROTATIONAL COUPLING DEVICE HAVING MEANS FOR SEALING THE INTERFACE BETWEEN THE ARMATURE AND THE ELECTROMAGNET

BACKGROUND OF THE INVENTION a. Field of the Invention

This disclosure relates to a rotational coupling device such as a brake. In particular, the instant disclosure relates to a rotational coupling device having means for sealing an interface between an armature and an electromagnet of the rotational coupling device.

b. Background Art

One conventional type of rotational coupling device used in industrial applications comprises a spring-set, electromagnetically released brake. In such a brake, a rotor or friction disc is coupled to a rotating member. Springs bias a non-rotating armature into engagement with the rotor, trapping the rotor against a brake plate, in order to engage the brake. An electromagnet is then used to create an electromagnetic circuit to draw the armature away from the rotor when it is desired to disengage the brake.

The above-described brakes work well for their intended purpose. The brakes have drawbacks, however. Dust and other particulate matter often accumulates in the interface between the armature and the electromagnet. The particulate matter can cause damage to the surfaces of the armature and electromagnet and weaken the electromagnetic circuit thereby reducing the operational life of the brake.

The inventor herein has recognized a need for a rotational coupling device that will minimize and/or eliminate one or more of the above-identified deficiencies.

BRIEF SUMMARY OF THE INVENTION

A rotational coupling device is provided. In particular, a rotational coupling device is provided having means for sealing the interface between the armature and the electromagnet.

A rotational coupling device in accordance with one embodiment of the invention includes a rotor configured for rotation about a rotational axis. The device further includes a brake plate disposed on a first axial side of the rotor and an armature disposed on a second axial side of the rotor opposite the brake plate. The device further includes an electromagnet disposed on one axial side of the armature opposite the rotor and the brake plate. The device further includes a spacer disposed axially between the brake plate and the electromagnet and radially outwardly of the rotor and the armature. The device further includes a seal supported on a radially inner surface of the spacer radially outward of the armature.

A rotational coupling device in accordance with another embodiment of the invention includes a rotor configured for rotation about a rotational axis. The device further includes a brake plate disposed on a first axial side of the rotor and an armature disposed on a second axial side of the rotor opposite the brake plate. The device further includes an electromagnet disposed on one axial side of the armature opposite the rotor and the brake plate. The device further includes a spacer disposed axially between the brake plate and the electromagnet and radially outwardly of the rotor and the armature. The device further includes means, supported on a radially inner surface of the spacer, for sealing an interface between the armature and the electromagnet.

A rotational coupling device in accordance with the present teachings is advantageous relative to conventional devices. In particular, the inventive device provides a relatively inexpensive and less complex means for sealing the interface between the armature and electromagnet in the device in such a way that the accumulation of dust and other particular matter in the interface is minimized. As a result, the operational life of the device is extended relative to conventional devices.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
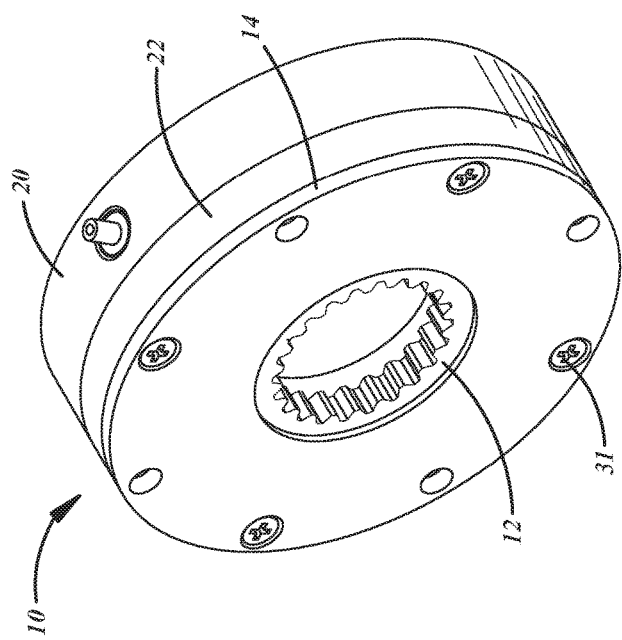
FIG. 1 is a perspective view of a rotational coupling device in accordance with one embodiment of the present invention.
Figure 2:
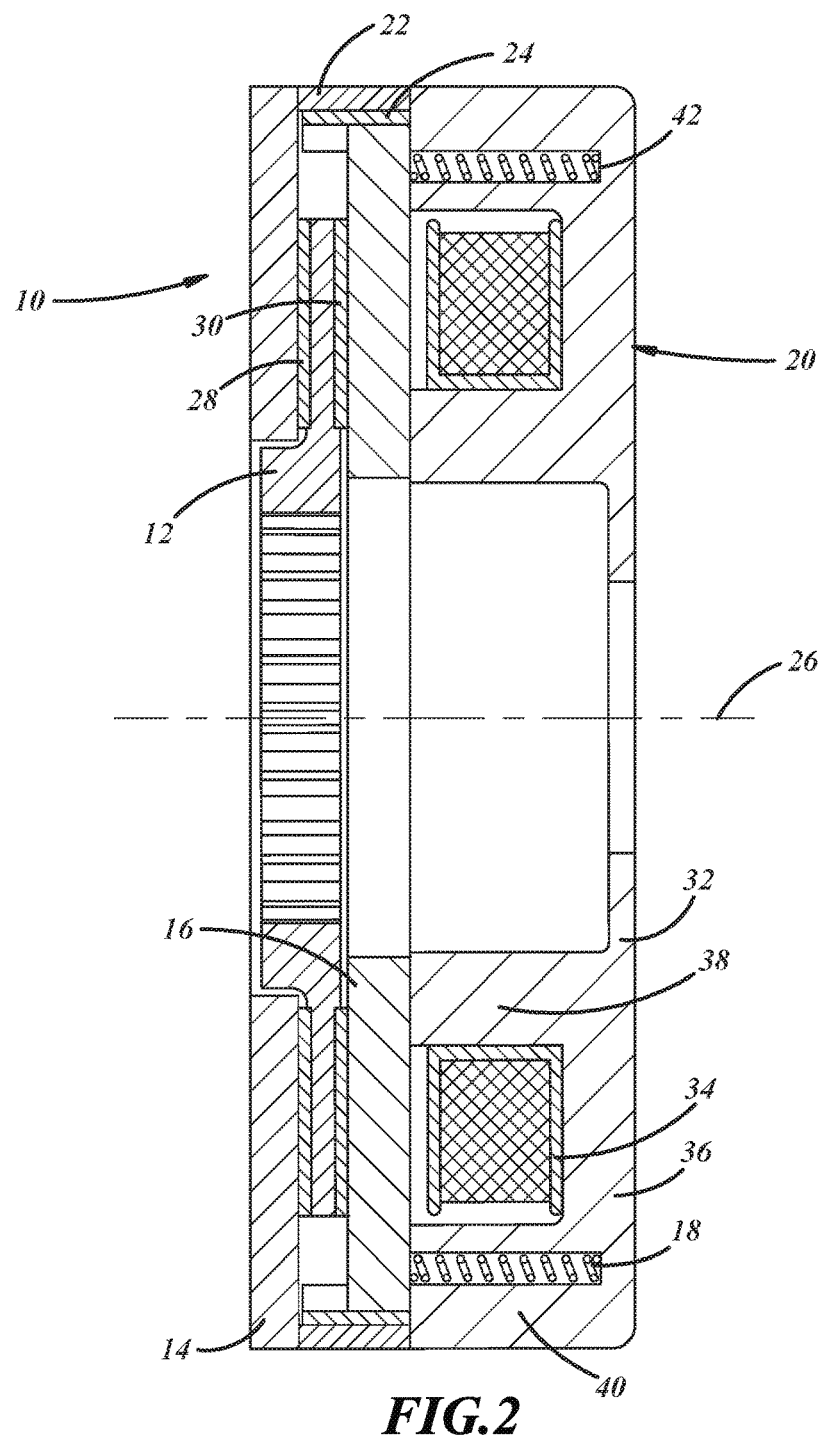
FIG. 2 is a cross-sectional view of a rotational coupling device in accordance with one embodiment of the present invention.

Referring now to the drawings wherein like reference numerals are used to identify identical components in the various views, FIG. 1-2 illustrate one embodiment of a rotational coupling device 10. In the illustrated embodiment, device 10 provides a braking torque to a rotating body such as a shaft, gear, pulley, blade, etc. in order to slow or halt rotation of the rotating body. It will be understood by those of ordinary skill in the art that device 10 could also be may be used in a wide variety of industrial and other applications requiring a brake. Device 10 may include a rotor 12, a brake plate 14, an armature 16, springs 18, an electromagnet 20, a spacer 22 and means, such as seal 24, for sealing an interface between armature 16 and electromagnet 18.

Rotor 12 is provided to transmit a braking torque to a shaft or other rotating body. Rotor 12 may be made from conventional metals or plastics and may be made by stamping, molding and/or machining. Rotor 12 may be annular in shape and disposed about, and centered about, a rotational axis 26. Rotor 12 is coupled to, and configured for rotation with, a shaft (not shown) about axis 26 and may be rotationally coupled to the shaft in a variety of ways that permit axial movement of rotor 12 relative to the shaft to enable proper operation of device 10 and account for wear, vibration, runout or thermal expansion. For example, the radially inner surface of rotor 12 and the radially outer surface of the shaft may have complementary, torque transmitting, shapes such as splines (as shown in the illustrated embodiment), a key and keyway, single or double D-shape or hexagonal shape. Rotor 12 includes friction surfaces on opposed sides 28, 30 configured to engage brake plate 14 and armature 16, respectively, during application or engagement of the brake.

Brake plate 14 is configured to engage rotor 12 during application of the brake to transmit a braking torque to rotor 12. Brake plate 14 provides a reaction surface against which armature 16 presses rotor 12 during application of the brake. Brake plate 14 may be made from conventional metals or plastics and may be made from steel (including stainless steel) in some embodiments. Brake plate 14 is disposed on side 28 of rotor 12. Brake plate 14 may further be disposed about, and centered about, axis 26. Brake plate 14 is fixed against rotation and may be coupled to electromagnet 20 using a plurality of axially extending fasteners 31 such as bolts, pin, screws or the like as described in greater detail below.

Armature 16 is also configured to engage rotor 12 during application of the brake to transmit a braking torque to rotor 12. Armature 16 may be made from metals or metal alloys or other materials having relatively low magnetic reluctance such as iron or steel. Armature 16 is disposed on side 30 of rotor 12. Armature 16 may further be disposed about, and centered about, axis 26. Armature 16 is fixed against rotation, but is axially movable towards and away from rotor 12 and brake plate 14 to permit engagement and disengagement of the brake. Armature 16 may include a plurality of bores extending through armature 16 or a plurality of recesses in the radially outer surface of armature 16 configured to permit fasteners 31 connecting brake plate 12 and electromagnet 20 to pass through armature 16. In this manner, the fasteners 31 limit or prevent rotation of armature 16 about axis 26, but armature 16 is permitted to move along axis 26.

Springs 18 provide a means for biasing armature 16 in one direction along axis 26 towards rotor 12 and brake plate 14 to engage the brake. Springs 18 may be disposed between electromagnet 20 and armature 16. It should be understood that device 10 may include either a single annular spring 18 or a plurality of springs 18 disposed in an annular array about axis 26. In the latter case, springs 18 may be spaced equally circumferentially spaced about axis 26.

Electromagnet 20 provides a means for urging armature 16 in the opposite direction along axis 26 away from rotor 12 and brake plate 14 to disengage the brake. Electromagnet 20 may include a field shell 32 and a conductor 34. Field shell 32 houses conductor 34 and may also provide structural support and orient other components of device 10 including brake plate 14 and springs 18. Field shell 32 may be annular in shape and disposed about, and centered about, axis 26 and may be disposed on a side of armature 16 opposite rotor 12. Field shell 32 may be made from materials having a relatively low magnetic reluctance such as ferromagnetic materials. Field shell 32 may define a radially extending end wall 36 and axially extending, radially aligned, inner and outer walls 38, 40 that extend axially from end wall 36 towards armature 16. Outer wall 40 may define one or more closed bores 42 configured to receive one end of each spring 18. Outer wall 40 may also define one or more closed bores (not shown) configured to receive fasteners 31 coupling brake plate 14, electromagnet 20 and spacer 22. Conductor 34 may comprise a conventional wound coil or similar conductor and is configured to be received within field shell 32 between walls 38, 40. Current supplied to conductor 34 creates an electromagnetic circuit that includes armature 16 and field shell 32. The electromagnetic circuit urges armature 16 towards field shell 32 and away from rotor 12 against the force of springs 18 to disengage the brake.

Figure 3:
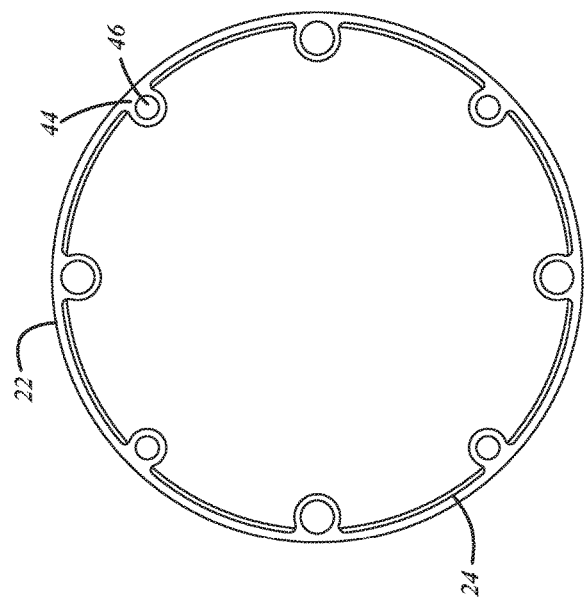
FIG. 3 is a plan view of a portion of the device of FIGS. 1-2.

Spacer 22 is provided to position and orient brake plate 14 and electromagnet 20 relative to one another and to define, together with brake plate 14 and electromagnet 20, an enclosed space containing rotor 12 and armature 16. In accordance with one aspect of the present teachings, spacer 22 is further configured to support seal 24. Spacer 22 may be made from conventional materials including metals, such as aluminum, or plastics that are non-magnetic or have a relatively high magnetic reluctance. Referring to FIG. 3, spacer 22 is annular in shape and may comprise a unitary (i.e., one-piece) body. Spacer 22 may include a plurality of equally circumferentially spaced, radially inwardly extending flanges 44. Each flange 44 may define a fastener bore 46 aligned with corresponding bores in brake plate 14 and field shell 32 of electromagnet 20 and configured to receive a corresponding fastener 31 extending through brake plate 14, spacer 22 and field shell 32 of electromagnet 20 in order to couple brake plate 14, spacer 22 and field shell 32 together. Referring again to FIG. 2, upon assembly, spacer 22 is disposed radially outwardly of rotor 12 and armature 16 with one axial end of spacer 22 abutting brake plate 14 and an opposite axial end abutting field shell 32.

Figure 4:
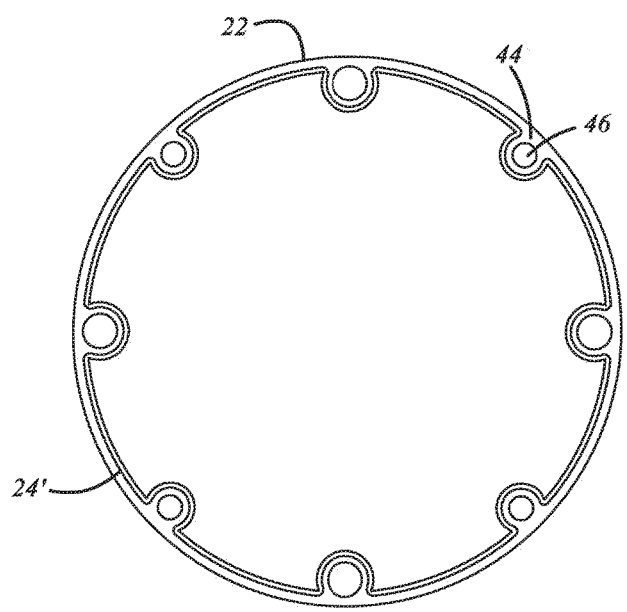
FIG. 4 is a plan view of an alternative embodiment of a portion of the device of FIGS. 1-2.

Seal 24 provides a means for sealing the interface between armature 16 and electromagnet 20. Seal 24 may comprise a fabric woven from a plurality of fibers. In accordance with certain aspects of the present teachings, the fibers may comprise synthetic fibers and, in particular, aromatic polyamide (or "aramid") fibers. Referring to FIG. 3, seal 24 may comprise a plurality of separate, circumferential segments. In this case, the segments may have a circumferential length such that each circumferential end terminates adjacent to a corresponding flange 44. Referring to FIG. 4, in an alternative embodiment, a seal 24' may comprise an annular, unitary (one-piece) body. Seal 24 is supported on, and carried by, spacer 22. Seal 24 may be disposed on, and bonded to, a radially inner surface of spacer 22 using conventional adhesives. Upon assembly, seal 24 is disposed radially outwardly of rotor 12 and armature 16 and seal 24 extends across the axial length of spacer 22 such that one axial end of seal 24 abuts brake plate 12 and an opposite axial end of spacer 24 abuts field shell 32 of electromagnet 20. During operation of device 10, seal 24 contains dust and other particulates on one side of armature 16 facing rotor 12. Seal 24 prevents particulates from reaching the opposite side of armature 16 facing electromagnet 20 to prevent particulates from reaching the interface between armature 16 and electromagnet 20. In this manner, buildup of particulates at the interface and damage to the engagement surfaces of armature 16 and electromagnet 20 is reduced thereby allowing maintenance of the strength of the electromagnetic circuit and prolonging the operational life of device 10.

A rotational coupling device 10 in accordance with the present teachings is advantageous relative to conventional devices. In particular, the inventive device 10 provides a relatively inexpensive and less complex means for sealing the interface between the armature 16 and electromagnet 20 in device 10 in such a way that the accumulation of dust and other particular matter in the interface is minimized. As a result, the operational life of device 10 is extended relative to conventional devices While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
   a rotor configured for rotation about a rotational axis;
   a brake plate disposed on a first axial side of the rotor;
   an armature disposed on a second axial side of the rotor opposite the brake plate;
   an electromagnet disposed on a first axial side of the armature opposite the rotor and the brake plate;
   a spacer disposed axially between the brake plate and the electromagnet and radially outwardly of the rotor and the armature; and, a seal supported on a radially inner surface of the spacer radially outward of the armature, the seal sealing an interface between the armature and the electromagnet and inhibiting particulates on a second axial side of the armature facing the rotor from travelling to the first axial side of the armature.

2. The rotational coupling device of claim 1 wherein the seal is disposed radially outward of the rotor.

3. The rotational coupling device of claim 1 wherein the seal is bonded to the radially inner surface of the spacer.

4. The rotational coupling device of claim 1 wherein the seal is a unitary body.

5. The rotational coupling device of claim 1 wherein the seal comprises a plurality of circumferential segments.

6. The rotational coupling device of claim 1 wherein the spacer defines a plurality of fastener bores aligned with corresponding bores in the brake plate and electromagnet.

7. The rotational coupling device of claim 1 wherein the spacer comprises a unitary, annular body.

8. The rotational coupling device of claim 1 wherein the seal comprises a fabric of fibers.

9. The rotational coupling device of claim 8 wherein the fibers comprise synthetic fibers.

10. The rotational coupling device of claim 9 wherein the fibers comprise aromatic polyamide fibers.

11. The rotational coupling device of claim 1 wherein the spacer is disposed entirely between the brake plate and the electromagnet.

12. The rotational coupling device of claim 1 wherein the brake plate, the electromagnet and the spacer have a common outer diameter.

13. The rotational coupling device of claim 1 wherein a length of the spacer is equal to a width of the rotor, a width of the armature and an air gap between the armature and the electromagnet when the armature is disengaged from the electromagnet.

14. The rotational coupling device of claim 1 wherein the spacer is made from a non-ferromagnetic material.

15. A rotational coupling device, comprising:
a rotor configured for rotation about a rotational axis;
a brake plate disposed on a first axial side of the rotor;
an armature disposed on a second axial side of the rotor opposite the brake plate;
an electromagnet disposed on one axial side of the armature opposite the rotor and the brake plate;
a spacer disposed axially between the brake plate and the electromagnet and radially outwardly of the rotor and the armature; and,
a seal supported on a radially inner surface of the spacer radially outward of the armature
wherein a first axial end of the seal abuts the electromagnet.

16. The rotational coupling device of claim 15 wherein a second axial end of the seal abuts the brake plate.

17. A rotational coupling device, comprising:
a rotor configured for rotation about a rotational axis;
a brake plate disposed on a first axial side of the rotor;
an armature disposed on a second axial side of the rotor opposite the brake plate;
an electromagnet disposed on a first axial side of the armature opposite the rotor and the brake plate;
a spacer disposed axially between the brake plate and the electromagnet and radially outwardly of the rotor and the armature; and,
means, supported on a radially inner surface of the spacer, for sealing an interface between the armature and the electromagnet and inhibiting particulates on a second axial side of the armature facing the rotor from travelling to the first axial side of the armature.

18. The rotational coupling device of claim 17 wherein a first axial end of the sealing means abuts the electromagnet.

19. The rotational coupling device of claim 18 wherein a second axial end of the sealing means abuts the brake plate.

20. The rotational coupling device of claim 17 wherein the sealing means is bonded to the radially inner surface of the spacer.

21. The rotational coupling device of claim 17 wherein the sealing means is a unitary body.

22. The rotational coupling device of claim 17 wherein the sealing means comprises a plurality of circumferential segments.

23. The rotational coupling device of claim 17 wherein the spacer comprises a unitary, annular body.

24. The rotational coupling device of claim 17 wherein the sealing means comprises a fabric of polyamide fibers.

* * * * *